US009932858B2

United States Patent
Miller et al.

(10) Patent No.: US 9,932,858 B2
(45) Date of Patent: Apr. 3, 2018

(54) GAS TURBINE ENGINE FRAME ASSEMBLY

(71) Applicant: General Electric Company, Schenectady, NY (US)

(72) Inventors: Brandon Wayne Miller, Cincinnati, OH (US); Richard Schmidt, Loveland, OH (US); Daniel Alan Niergarth, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 316 days.

(21) Appl. No.: 14/809,560

(22) Filed: Jul. 27, 2015

(65) Prior Publication Data
US 2017/0030220 A1 Feb. 2, 2017

(51) Int. Cl.
| F01D 25/16 | (2006.01) |
| F02C 7/32 | (2006.01) |
| F01D 25/20 | (2006.01) |
| F01D 25/18 | (2006.01) |
| F01D 9/06 | (2006.01) |

(52) U.S. Cl.
CPC ......... F01D 25/164 (2013.01); F01D 25/162 (2013.01); F01D 25/18 (2013.01); F01D 25/20 (2013.01); F02C 7/32 (2013.01); *F01D 9/065* (2013.01); *F05D 2260/98* (2013.01); *Y02T 50/671* (2013.01)

(58) Field of Classification Search
CPC ....... F01D 25/164; F01D 25/18; F01D 25/183; F01D 25/186; F01D 25/20; F01D 9/065; F02C 7/06; F02C 7/32; Y02T 50/671; F05D 2260/98
See application file for complete search history.

(56) References Cited

U.S. PATENT DOCUMENTS

| 5,074,109 A | 12/1991 | Mandet et al. |
| 5,079,916 A | 1/1992 | Johnson |
| 5,114,446 A * | 5/1992 | Giersdorf ................ F01D 25/18 |
| | | 55/345 |
| 6,409,464 B1 | 6/2002 | Fisher et al. |
| 7,097,415 B2 | 8/2006 | Bart et al. |
| 8,033,094 B2 | 10/2011 | Suciu et al. |

(Continued)

FOREIGN PATENT DOCUMENTS

| EP | 2565385 A2 | 3/2013 |
| FR | 2877399 A1 | 5/2006 |
| GB | 2419639 A | 5/2006 |

OTHER PUBLICATIONS

European Search Report and Opinion issued in connection with corresponding EP Application No. 16181293.8 dated Dec. 22, 2016.

*Primary Examiner* — Woody Lee, Jr.
*Assistant Examiner* — Elton Wong
(74) *Attorney, Agent, or Firm* — General Electric Company; Pamela A. Kachur

(57) ABSTRACT

A gas turbine engine is provided including a shaft coupling a compressor of a compressor section to a turbine of a turbine section. An aft bearing assembly, including at least two bearings, is positioned at least partially in an aft sump and supports the shaft within the turbine section. The aft sump is configured to receive lubrication oil from a lubrication oil supply extending through at least a portion of a turbine center frame of the turbine section, and provide such lubrication to the at least two bearings of the aft bearing assembly.

18 Claims, 4 Drawing Sheets

(56) References Cited

U.S. PATENT DOCUMENTS

| | | |
|---|---|---|
| 8,511,986 B2 | 8/2013 | Alvanos et al. |
| 8,511,987 B2 | 8/2013 | Reinhardt et al. |
| 8,845,277 B2 | 9/2014 | Davis |
| 8,869,504 B1 | 10/2014 | Schwarz et al. |
| 8,919,133 B2 | 12/2014 | Bart et al. |
| 2004/0060279 A1* | 4/2004 | Robert Joseph .......... F01D 1/24 60/226.1 |
| 2006/0090450 A1* | 5/2006 | Moniz ...................... F01D 1/26 60/226.1 |
| 2009/0133581 A1 | 5/2009 | Fang et al. |
| 2013/0078079 A1* | 3/2013 | LaPierre ................ F01D 25/16 415/110 |
| 2014/0174858 A1* | 6/2014 | Remer ...................... F02C 7/06 184/106 |
| 2014/0186158 A1 | 7/2014 | Merry et al. |

\* cited by examiner

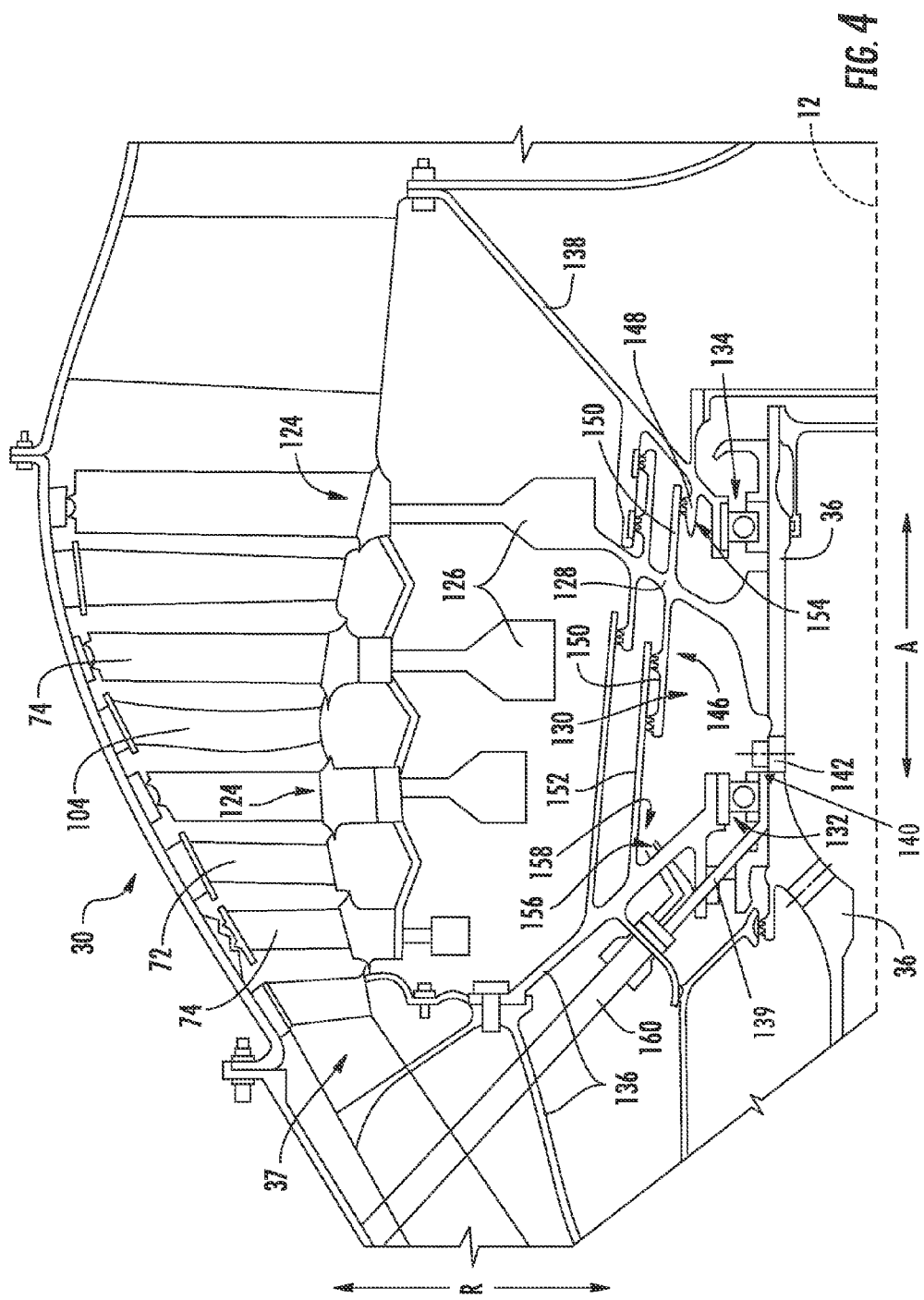

GAS TURBINE ENGINE FRAME ASSEMBLY

FIELD OF THE INVENTION

The present subject matter relates generally to a gas turbine engine, or more particularly to a gas turbine engine having a particular frame configuration.

BACKGROUND OF THE INVENTION

A gas turbine engine generally includes a fan and a core arranged in flow communication with one another. The core of the gas turbine engine general includes, in serial flow order, a compressor section, a combustion section, a turbine section, and an exhaust section. With multi-shaft gas turbine engines, the compressor section can include a high pressure compressor (HP compressor) and a low pressure compressor (LP compressor), and the turbine section can similarly include a high pressure turbine (HP turbine) and a low pressure turbine (LP turbine). With such a configuration, the HP compressor is coupled with the HP turbine via a high pressure shaft (HP shaft), and the LP compressor is coupled with the LP turbine via a low pressure shaft (LP shaft).

In operation, at least a portion of air over the fan is provided to an inlet of the core. Such portion of the air is progressively compressed by the LP compressor and HP compressor until it reaches the combustion section. Fuel is mixed with the compressed air and burned within the combustion section to provide combustion gases. The combustion gases are routed from the combustion section through the HP turbine and LP turbine. The flow of combustion gasses through the turbine section drives the HP turbine and the LP turbine, each of which in turn drive a respective one of the HP compressor and the LP compressor via the HP shaft and LP shaft. The combustion gases are then routed through the exhaust section, e.g., to atmosphere.

In addition to driving the LP compressor, the LP shaft can additionally drive the fan through a fan gearbox. The gearbox allows the LP shaft to be rotated at a higher speed relative to the fan for greater efficiency. However, rotation of the LP shaft at the relatively high speeds for achieving the desired rotational speed of the fan may result in an instability of the LP shaft. An option for improving the stability of the LP shaft is by making the LP shaft larger in diameter is restricted by radial space limitations.

Accordingly, a gas turbine engine having one or more components for increasing the stability of the LP shaft while rotating the LP shaft at relatively high speeds would be useful. Specifically, a gas turbine engine having one or more components for increasing the stability of the LP shaft without requiring a diameter of the LP shaft to be substantially increased would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a gas turbine engine is provided. The gas turbine engine includes a compressor section including one or more compressors and a turbine section located downstream of the compressor section. The turbine section includes one or more turbines, a turbine center frame, and a turbine rear frame. The gas turbine engine also includes a shaft mechanically coupling at least one of the one or more compressors of the compressor section to at least one of the one or more turbines of the turbine section. The gas turbine engine also includes an aft bearing assembly including at least two bearings positioned in an aft sump and supporting the shaft in the turbine section. The aft sump is configured to receive lubrication oil from a lubrication oil supply extending through at least a portion of the turbine center frame and to provide such lubrication oil to the at least two bearings of the aft bearing assembly.

In another exemplary embodiment of the present disclosure, a gas turbine engine is provided. The gas turbine engine includes a compressor section including a low pressure compressor and a turbine section located downstream of the compressor section. The turbine section includes a low pressure turbine, a turbine center frame having at least a portion positioned forward of the low pressure turbine, and a turbine rear frame having at least a portion positioned aft of the low pressure turbine. The gas turbine engine also includes a low pressure shaft mechanically coupling the low pressure compressor to the low pressure turbine and an aft bearing assembly positioned at least partially within an aft sump. The aft bearing assembly is positioned within the turbine section and includes a first bearing and a second bearing, the first and second bearings of the aft bearing assembly configured to receive lubrication oil from a lubrication oil supply extending through at least a portion of the turbine center frame.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 4 is a close-up, schematic, cross-sectional view of an aft end of the core of the exemplary gas turbine engine of FIG. 1.

DETAILED DESCRIPTION OF THE INVENTION

Figure 1:
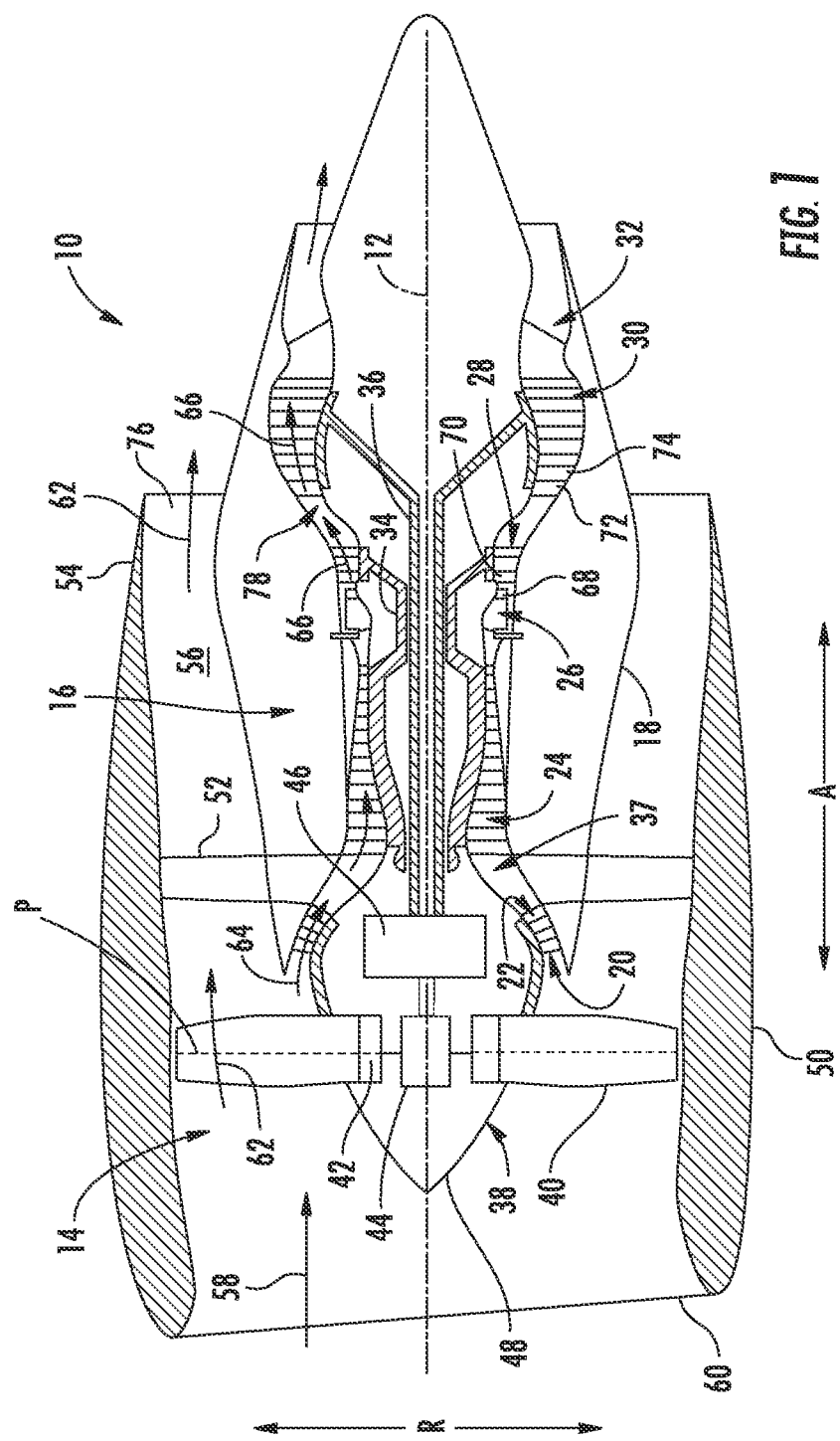
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for adjusting the rotational speed of the fan 38 relative to the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboshaft engine, turboprop engine, turbocore engine, turbojet engine, etc.

Figure 2:
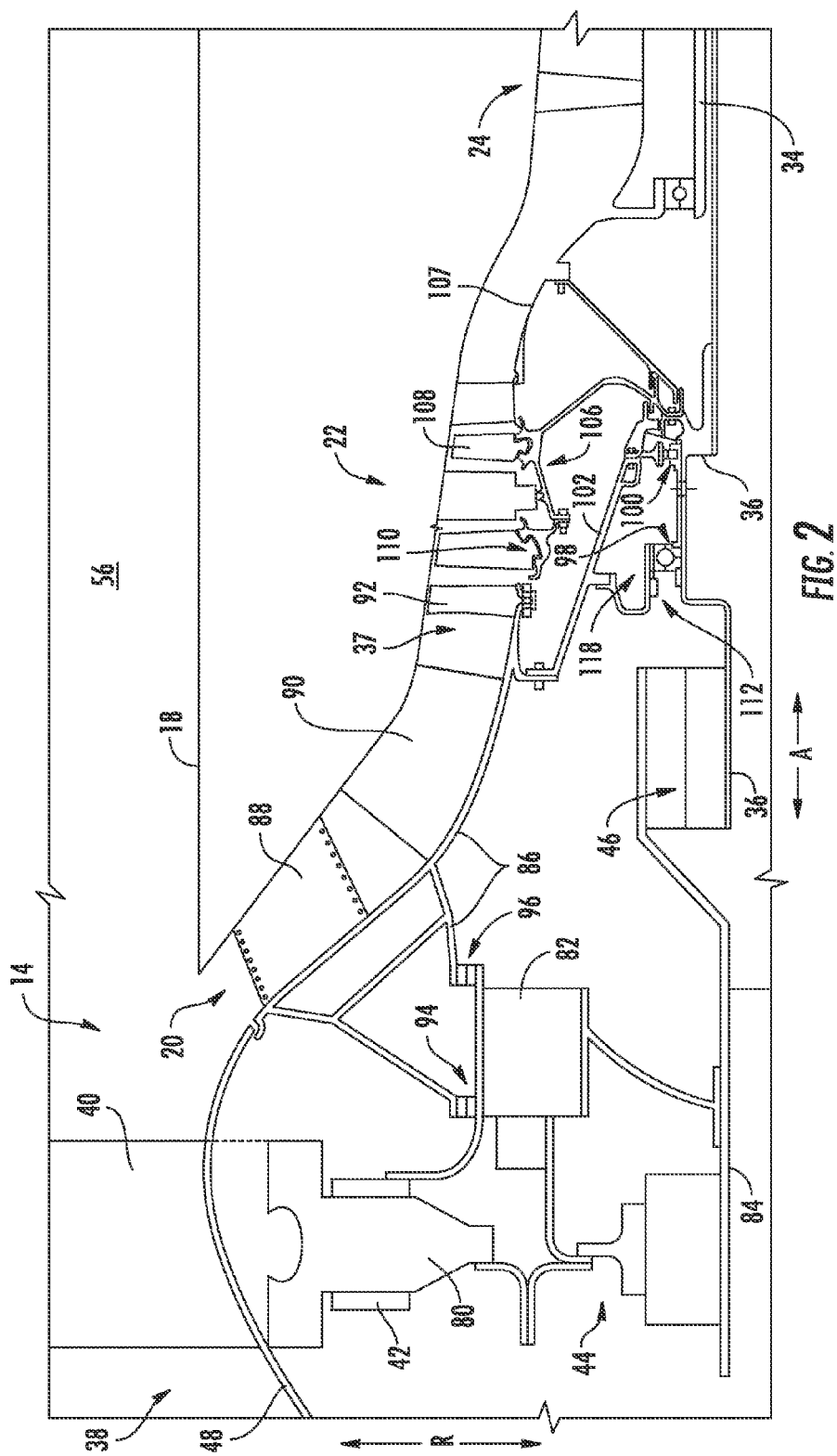
FIG. 2 is a schematic, cross-sectional view of a forward end of a core of the exemplary gas turbine engine of FIG. 1.

Referring now to FIG. 2, a schematic, cross-sectional view of a forward end of the turbofan engine 10 of FIG. 1 is provided. Specifically, FIG. 1 provides a schematic, cross-sectional view of a portion of the fan section 14 and the LP compressor 22 of the compressor section.

As discussed above and depicted in FIG. 2, the fan section 14 generally includes the variable pitch fan 38 having the plurality of fan blades 40 coupled to the disk 42. More specifically, each fan blade 40 is coupled at a base to a trunnion mechanism 80, and the trunnion mechanism 80 is attached to the disk 42. The trunnion mechanism 80 facilitates rotation of a respective fan blade 40 about the respective fan blades' 40 pitch axis P. Additionally, each trunnion mechanism 80 is operable with the actuation member 44 for changing a pitch of each of the fan blades 40 in unison.

Further, the variable pitch fan 38 is rotatable about the longitudinal axis 12 by the LP shaft 36 across the power gearbox 46. Specifically, the disk 42 is attached through one or more frame members and a balancing device 82 to a fan rotor 84 of the fan section 14. The fan rotor 84 of the fan section 14 is, in turn, connected to the LP shaft 36 through the gearbox 46.

The fan section 14 additionally includes the front hub 48 (which is rotatable with, e.g., be plurality of fan blades 40)

and a stationary fan frame 86. The fan frame 86 is connected through the core air flowpath 37 of the core 16 to the outer casing 18 of the core 16. For the embodiment depicted, the core 16 includes a forward vane 88 and a strut 90, each providing structural support between the outer casing 18 of the core 16 and the fan frame 86. Additionally, the LP compressor 22 includes an inlet guide vane 92. The inlet guide vane 92 may be configured as a variable inlet guide vane, such that the guide vane 92 is rotatable about an axis extending substantially parallel to the radial direction R. The forward vane 88, strut 90, and inlet guide vane 92 may additionally be configured to condition and direct the portion of the flow of air over the fan 38 provided to the core air flowpath 37 to, e.g., increase an efficiency of the compressor section.

The fan frame 86 supports the various rotating components of the fan 38 through one or more bearings. Specifically, for the embodiment depicted, the fan frame 86 supports the various rotating components of the fan 38 through a forward fan bearing 94 and an aft fan bearing 96. For the embodiment depicted, the forward fan bearing 94 is configured as roller bearing and the aft fan bearing 96 is configured as a tapered bearing. However, in other exemplary embodiments, one or both of the forward fan bearing 94 or aft fan bearing 96 may instead be configured as, e.g., a roller bearing, a ball bearing, or any other suitable bearing. Additionally, in still other exemplary embodiments, one or more additional bearings may be included as well.

Referring still to FIG. 2, within the compressor section, a forward bearing assembly is provided for supporting the LP shaft 36. For the embodiment depicted, the forward bearing assembly includes a first bearing and a second bearing. The first bearing is configured as a ball bearing 98 and is positioned forward of the second bearing, which is configured as a roller bearing 100, such as a cylindrical roller bearing. The ball bearing 98 and roller bearing 100 of the forward bearing assembly each support the LP shaft 36 relative to an LP compressor bearing support cone 102. The ball bearing 98 and roller bearing 100 may be formed of any suitable material. For example, in at least certain exemplary embodiments, the ball bearing 98 and/or the roller bearing 100 may be formed of a suitable metal material, such as a stainless steel. Alternatively, however in other exemplary embodiments one or both of the ball bearing 98 and/or roller bearing 100 may include one or more components formed of a suitable ceramic material.

Notably, inclusion of the two bearings in the forward bearing assembly, and moreover, positioning of the ball bearing 98 forward of the roller bearing 100 may allow for sturdier support of the LP shaft 36. For example the ball bearing 98 may be configured to absorb forces along the radial direction R, as well as forces along the axial direction A. Thus, the ball bearing 98 may also be referred to as a thrust bearing. By contrast, the roller bearing 100 may only be capable of absorbing forces along the radial direction R. Accordingly, by positioning the ball bearing 98 forward of the roller bearing 100, and spacing the two bearings apart from one another along the axial direction A, the forward bearing assembly may provide an increased amount of support to the LP shaft 36.

For the embodiment depicted, the LP compressor bearing support cone 102 is attached directly to the fan frame 86 of the turbofan engine 10. The attachment of the LP compressor bearing support cone 102 directly to the fan frame 86, in conjunction with the forward bearing assembly, may assist in maintaining the LP compressor 22 and/or the LP turbine 30 rotating on-axis, while preventing an overspeed condition of the core 16 in the event of, e.g., a failure of the LP shaft 36. Overspeed refers generally to a rotation of one or more components of the core 16 at speeds in excess of their respective design limits, and may be an issue in certain embodiments wherein a rotating component is capable of continued rotation about an axis despite a failure of, e.g., a shaft to which it is connected. Specifically, with the present embodiment, should the LP shaft 36 fail forward of the forward bearing assembly, e.g., between the forward bearing assembly and the gearbox 46, the LP compressor bearing support cone 102 will remain attached to the fan frame 86 and the LP compressor 22 will remain attached to the LP turbine 30. Accordingly, the LP compressor 22 will provide sufficient drag to safely shut down the turbofan engine 10. Alternatively, however, should the LP shaft 36 fail aft of the forward bearing assembly, a curved vane 104 (see FIG. 4) within the LP turbine 30 will clash with an adjacent stator vane and/or rotor blade to slow down the turboshaft engine 10 safely.

It should be appreciated, however, that in other exemplary embodiments, the LP compressor bearing support cone 102 may additionally or alternatively be attached to a compressor frame 107 extending between the LP compressor 22 and HP compressor 24, sometimes referred to as a compressor front frame. The compressor frame 107 is a stationary frame member of the core 16 which at least partially defines the core air flowpath 37 between the LP compressor 22 and HP compressor 24.

Figure 3:
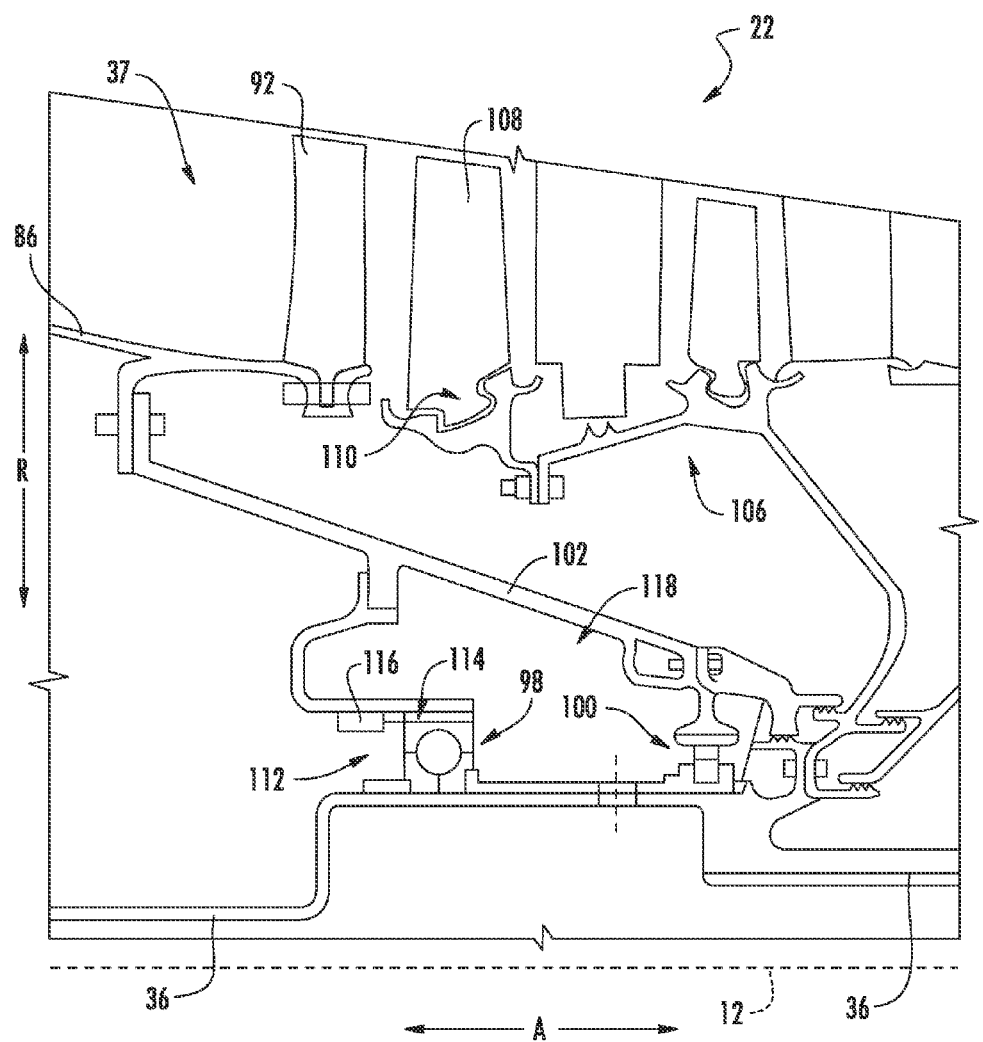
FIG. 3 is a close-up, schematic, cross-sectional view of an LP compressor of the core of the exemplary gas turbine engine of FIG. 1.

Referring now also to FIG. 3, a close-up, schematic view of the forward bearing assembly and LP compressor 22 is provided. As stated, the first bearing of the forward bearing assembly is configured as the ball bearing 98 and the second bearing of the forward bearing assembly is configured as the roller bearing 100. The dual bearing assembly may provide for greater stability and support of the LP shaft 36 within the LP compressor 22. Notably, in order to better accommodate the dual bearing configuration, the LP compressor 22 is configured as a disk drum LP compressor. More particularly, the LP compressor 22 includes one or more stages of rotatable blades 108 attached at a base 110 to an LP compressor disk drum 106. The LP compressor disk drum 106 may essentially be configured as an annular drum having a plurality of attachment slots for the various stages of LP compressor blades 108. Utilization of an LP compressor disk drum 106 in the LP compressor 22 may provide for a lighter and more compact LP compressor 22 configuration such that the dual bearing, forward bearing assembly may be utilized.

Additionally, the forward bearing assembly depicted includes dampening features for the LP shaft 36. Specifically, the ball bearing 98 includes a squeeze film dampener 112 to increase a dynamic stability of the LP shaft 36. The squeeze film dampener 112 may be formed of a thin film of lubrication oil located in a cavity 114 defined between a radially outer race of the roller bearing 98 and a portion of the LP compressor bearing support cone 102 to which is attached. The thin-film of lubrication oil may be less than about one hundred thousandths of an inch (0.100 inches) thick. For example, the squeeze film dampener 112 may be less than about seventy-five thousandths of an inch (0.075 inches) thick, less than about fifty thousandths of an inch (0.050 inches) thick, or less than about twenty thousandths of an inch (0.020 inches) thick. For example, in certain exemplary embodiments, the thin-film of lubrication oil may be approximately fifteen thousands of an inch (0.015 inches) thick. It should be appreciated, that as used herein, terms of approximation, such as "about" or "approximately," refer to being within a ten percent margin of error. For the embodiment depicted, the flow of lubrication oil to the cavity 114 forming the squeeze film dampener 112 may be provided by a nozzle 116 in fluid communication with a lubrication oil supply (not shown).

It should be appreciated, however, that the exemplary embodiment depicted in FIGS. 2 and 3 are provided by way of example only, and that in other exemplary embodiments, any other suitable configuration may be provided. For example, in other exemplary embodiments, the fan 38 may be configured in any other suitable manner (e.g., as a fixed pitch fan, a non-geared fan, etc.) and further may be supported using any other suitable fan frame configuration. Additionally, although for the exemplary embodiment depicted the forward bearing assembly includes the ball bearing 98 positioned forward of the roller bearing 100, in other exemplary embodiments, the configuration of the two bearings may be reversed. Alternatively, the roller bearing 96 may be any other suitable bearing for withstanding an axial and a radial force (e.g., one or more tapered roller bearings). Alternatively still, in other exemplary embodiments, a single bearing may be provided in the forward bearing assembly.

Moreover, it should also be appreciated that in other exemplary embodiments, any other suitable LP compressor 22 configuration may be utilized. For example, in other exemplary embodiments, the various stages of LP compressor blades 108 may be attached to corresponding rotors (as opposed to the LP compressor disk drum 106 depicted) and the rotors may be attached in any suitable manner to the LP shaft 36.

Referring still to FIGS. 2 and 3, the forward bearing assembly is positioned at least partially within a forward sump 118 and the compressor section of the core 16. The forward sump 118 may be configured to receive lubrication oil from one or more lubrication oil supply lines (not shown).

Referring now to FIG. 4, a close-up, schematic view of an aft end of the core 16 of the exemplary turbofan engine 10 of FIG. 1 is provided. Specifically, FIG. 4 provides a close-up, schematic view of an aft bearing assembly supporting the LP shaft 36 within the turbine section.

As briefly discussed above, the LP turbine 30 generally includes various stages of rotor blades 74, each attached at a base 124 to respective rotor 126. Additionally, various stages of stator vanes 72 are positioned between adjacent stages of rotor blades 74. The plurality of rotors 126 within the LP turbine 30 are connected to one another, and are also connected to the LP shaft 36, such that rotation of the plurality of rotors 126 within the LP turbine 30 rotates the LP shaft 36 (and correspondingly rotates the LP compressor 22). Specifically, an LP turbine connection member 128 attaches the various LP turbine rotors 126 to the LP shaft 36. The LP turbine connection member 128 may be formed integrally with one of the plurality of LP turbine rotors 126, or alternatively may be attached to one of the plurality of LP turbine rotors in any suitable manner. Additionally or alternatively, the LP turbine connection member 128 may be attached to the LP shaft 36 in any suitable manner, or alternatively may be formed integrally with the LP shaft 36.

The aft bearing assembly is at least partially positioned in an aft sump 130, and as stated, supports the LP shaft 36 within the turbine section. The aft bearing assembly depicted generally includes a first LP turbine bearing 132 and a second LP turbine bearing 134. The first LP turbine bearing 132 is positioned forward of the LP turbine connection member 128 extending between the LP turbine 30 and the LP shaft 36, and the second LP turbine bearing 134 is positioned aft of the LP turbine connection member 128 extending between the LP turbine 30 and the LP shaft 36. Additionally, the first and second LP turbine bearings 132, 134 are each depicted as ball bearings. However, in other exemplary embodiments, one or both of the first and second LP turbine bearings 132, 134 may alternatively be configured as any other suitable bearing. For example, in other exemplary embodiments, one or both of the first and second LP turbine bearings 132, 134 may be configured as, e.g., a cylindrical roller bearings, a tapered roller bearing, etc.

Referring still to the exemplary embodiment of FIG. 4, the first LP turbine bearing 132 is configured to support the LP shaft 36 through a turbine center frame 136 and the second LP turbine bearing 134 is configured to support the LP shaft 36 through a turbine rear frame 138. More particularly, the first LP turbine bearing 132 rotatably attaches the LP shaft 36 to the turbine center frame 136 and the second LP turbine bearing 134 rotatably attaches the LP shaft 36 to the turbine rear frame 138. Such a configuration may allow for a more stable LP shaft 36 during operation of the turbofan engine 10. For example, such a configuration may allow for increased rotational speeds of the LP shaft 36 while maintaining a desired amount of stability for the LP shaft 36.

For the embodiment of FIG. 4, the aft bearing assembly and the aft sump 130 are configured to receive lubrication oil from a lubrication oil supply extending through at least a portion of the turbine center frame 136. Specifically, the lubrication oil supply includes a lubrication oil supply line 139 fluidly connected to a lubrication oil pump (not shown). Additionally, the exemplary aft sump 130 depicted defines an opening 140 for receiving lubrication oil from the lubrication oil supply, or more particularly, from the lubrication oil supply line 139.

In order to ensure the lubrication oil is provided to the aft bearing assembly, an inducer 142 is positioned proximate to the opening 140 for spraying the lubrication oil flowing through the opening 140 from the lubrication oil supply line 139 onto at least a portion of the aft bearing assembly. Specifically, for the embodiment depicted, the inducer 142 is configured as a rotating paddle inducer configured to spray lubrication oil flowing through the opening 140 onto the first LP turbine bearing 132. The rotating paddle inducer may be rotatable about an axis substantially parallel to the axial direction A, with the rotation being generated by a flow of lubrication. However, in other exemplary embodiments, any other suitable form of inducer 142 may be used, such as a "screw" type inducer, or alternatively, no inducer 142 may be included.

The lubrication oil may flow from the first LP turbine bearing 132 to the second LP turbine bearing 134. One or more cavities (not shown) may be defined through the LP turbine connection member 128 to allow for such a flow. From the second LP turbine bearing 134, the aft sump 130 is configured such that the lubrication oil flows to a forward end and pools up for removal. More particularly, for the embodiment depicted, the aft sump 130 includes an outer wall 146 along the radial direction R. For the embodiment depicted, outer wall 146 is formed of various arms of the various frame members. Specifically, the outer wall 146 is formed of an arm 148 of the turbine rear frame 138, a pair of arms 150 of the LP turbine connection member 128, and an arm 152 of the turbine center frame 136. Notably, each of the arms 148, 150, 152 includes seals for maintaining the lubrication oil within the aft sump 130.

Additionally, as depicted, the exemplary outer wall 146 of the aft sump 130 slopes towards the longitudinal centerline 12 at an aft end 154 of the outer wall 146. More particularly, the outer wall 146 of the aft sump 130 may define an angle greater than zero relative to the longitudinal centerline 12 as viewed from an aft end 154 looking forward. For example, in certain embodiments, the outer wall 146 of the aft sump 130 may define an angle greater than or equal to about ten degrees relative to a longitudinal centerline 12. Such a configuration may assist with generating a desired flow profile for the lubrication oil within the aft sump 130, and may also allow for the LP turbine 30 to include larger rotors 126 towards an aft end of the LP turbine 30 to support longer rotor blades 74 towards the aft end of the LP turbine 30.

Notably, an aft sump outlet 156 is positioned proximate to a forward end 158 of the outer wall 146 of the aft sump 130. The aft sump outlet 156 may be fluidly connected to a scavenge pump (not shown) for scavenging lubrication oil from within the aft sump 130. Specifically, for the embodiment depicted, a scavenge line 160 extends from the scavenge pump, at least partially through the turbine center frame 136, and into the aft sump 130. A distal end of the scavenge line 160 defines the aft sump outlet 156 for scavenging lubrication oil from within the aft sump 130.

With the exemplary embodiment depicted in FIG. 4, the turbine rear frame 138 may be configured as a "dry" turbine rear frame 138. More particularly, the turbine rear frame 138 may have no lubrication oil supply lines or lubrication oil scavenge lines extending therethrough. Instead, the lubrication oil supply may flow through the LP shaft 36 itself, and the lubrication oil scavenging may extend through the turbine center frame 136.

A gas turbine engine routing lubrication oil through an LP shaft—the LP shaft mechanically coupling an LP compressor of the compressor section to an LP turbine of the turbine section—to an aft sump may provide for a more efficient means for providing lubrication oil to such sump. Additionally, such a configuration may allow for providing sufficient lubrication oil to a pair of bearings supporting the LP shaft without requiring potentially limiting lubrication oil supply line(s) or lubrication oil scavenge line(s) through an aft frame of the gas turbine engine. Accordingly, such a configuration may reduce a weight and complexity of said turbine aft frame, and may potentially improve an efficiency of the gas turbine engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine comprising:
a compressor section including one or more compressors;
a turbine section located downstream of the compressor section, the turbine section including one or more turbines, a turbine center frame, and a turbine rear frame;
a shaft mechanically coupling at least one of the one or more compressors of the compressor section to at least one of the one or more turbines of the turbine section;
an aft bearing assembly including at least two bearings positioned in an aft sump and supporting the shaft in the turbine section, the aft sump configured to receive lubrication oil from a lubrication oil supply extending through at least a portion of the turbine center frame and provide such lubrication oil to the at least two bearings of the aft bearing assembly; and
wherein the turbine rear frame is configured as a dry turbine rear frame having no lubrication oil supply lines or lubrication oil scavenge lines extending therethrough.

2. The gas turbine engine of claim 1, wherein a scavenge line extends from a scavenge pump at least partially through the turbine center frame to the aft sump for scavenging lubrication oil from within the aft sump.

3. The gas turbine engine of claim 1, wherein the one or more compressors of the compressor section includes a low pressure compressor, wherein the one or more turbines of the turbine section includes a low pressure turbine, and wherein the shaft is a low pressure shaft mechanically coupling the low pressure compressor to the low pressure turbine.

4. The gas turbine engine of claim 3, wherein the aft bearing assembly includes a first low pressure turbine bearing and a second low pressure turbine bearing, wherein the first low pressure turbine bearing is positioned forward of a connection member extending between the low pressure turbine and the low pressure shaft, and wherein the second low pressure turbine bearing is positioned aft of the connection member extending between the low pressure turbine and the low pressure shaft.

5. The gas turbine engine of claim 3, wherein the gas turbine engine defines a longitudinal centerline and a radial direction, wherein the aft sump includes an outer wall along the radial direction, and wherein the outer wall of the aft sump slopes towards the longitudinal centerline at an aft end of the outer wall.

6. The gas turbine engine of claim 3, wherein the aft sump defines a sump outlet fluidly connected to a scavenge pump, wherein the sump outlet is positioned proximate to a forward end of the outer wall.

7. The gas turbine engine of claim 1, wherein the aft sump defines an opening for receiving lubrication oil from the lubrication oil supply.

8. The gas turbine engine of claim 7, further comprising an inducer positioned proximate to the opening defined by the aft sump for spraying lubrication oil flowing through the opening onto at least a portion of the aft bearing assembly.

9. The gas turbine engine of claim 8, wherein the inducer is a rotating paddle inducer.

10. The gas turbine engine of claim 1, further comprising a forward bearing assembly positioned at least partially within a forward sump for supporting the shaft within the compressor section, wherein the forward bearing assembly includes a first bearing spaced from a second bearing, wherein the first bearing is a ball bearing, wherein the second bearing is a roller bearing, and wherein the first bearing is positioned forward of the second bearing.

11. The gas turbine engine of claim 10, wherein the first bearing includes a squeeze film dampener to increase dynamic stability.

12. The gas turbine engine of claim 10, wherein the first and second bearings of the forward bearing assembly support the shaft relative to a low pressure compressor bearing support cone, and wherein the low pressure compressor bearing support cone is attached to a fan frame of the gas turbine engine.

13. The gas turbine engine of claim 10, wherein the one or more compressors of the compressor section includes a low pressure compressor, wherein the shaft is a low pressure shaft mechanically coupled to the low pressure compressor, and wherein the low pressure compressor includes one or more stages of rotatable blades attached to an low pressure compressor disk drum.

14. A gas turbine engine comprising:
a compressor section including a low pressure compressor;
a turbine section located downstream of the compressor section and including a low pressure turbine, a turbine center frame having at least a portion positioned forward of the low pressure turbine, and a turbine rear frame having at least a portion positioned aft of the low pressure turbine;
a low pressure shaft mechanically coupling the low pressure compressor to the low pressure turbine;
an aft bearing assembly positioned at least partially within an aft sump, the aft bearing assembly positioned within the turbine section and comprised of a first bearing and a second bearing, the first and second bearings of the aft bearing assembly configured to receive lubrication oil from a lubrication oil supply extending through at least a portion of the turbine center frame; and
wherein a scavenge line extends from a scavenge pump at least partially through the turbine center frame to the aft sump for scavenging lubrication oil from within the aft sump, and wherein the turbine rear frame is configured as a dry turbine rear frame having no lubrication oil supply lines or lubrication oil scavenge lines extending therethrough.

15. The gas turbine engine of claim 14, wherein the first and second bearings of the aft bearing assembly are positioned on opposite sides of a connection member extending between the low pressure shaft and the low pressure turbine.

16. The gas turbine engine of claim 14, further comprising a forward bearing assembly for supporting the low pressure shaft within the compressor section comprised of a ball bearing positioned forward of a roller bearing, wherein the forward bearing assembly is positioned at least partially in a forward sump.

17. The gas turbine engine of claim 16 wherein the ball bearing of the forward bearing assembly includes a squeeze film dampener to increase dynamic stability.

18. The gas turbine engine of claim 16, wherein the ball bearing and the roller bearing of the forward bearing assembly support the low pressure shaft relative to a low pressure compressor bearing support cone, and wherein the low pressure compressor bearing support cone is attached to a fan frame of the gas turbine engine.

* * * * *